United States Patent
West et al.

(10) Patent No.: US 8,263,162 B2
(45) Date of Patent: Sep. 11, 2012

(54) NATURAL SWEETENER AND METHODS OF MANUFACTURING THEREOF

(75) Inventors: Leslie George West, Winnetka, IL (US); Dominic Vellucci, Eastchester, NY (US); Nam-Cheol Kim, Deerfield, IL (US); George William Haas, Mount Prospect, IL (US); Orlando Herrera-Gomez, Evanston, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 12 days.

(21) Appl. No.: 12/025,316

(22) Filed: Feb. 4, 2008

(65) Prior Publication Data

US 2009/0196966 A1 Aug. 6, 2009

(51) Int. Cl.
*A23L 1/236* (2006.01)
(52) U.S. Cl. .................. 426/548; 426/488; 426/536
(58) Field of Classification Search .................. 426/253
See application file for complete search history.

(56) References Cited

U.S. PATENT DOCUMENTS

| | | | |
|---|---|---|---|
| 4,084,010 A | 4/1978 | Takemoto et al. | |
| 5,411,755 A | 5/1995 | Downton et al. | |
| 5,433,965 A | 7/1995 | Fischer et al. | |
| 6,103,240 A | 8/2000 | Zhou | |
| 6,124,442 A | 9/2000 | Zhou et al. | |
| 6,461,659 B1 | 10/2002 | Zhou | |
| 6,682,766 B2 | 1/2004 | Blumenstein-Stahl et al. | |
| 2003/0165603 A1 | 9/2003 | Burklow et al. | |
| 2003/0170365 A1 | 9/2003 | Huang | |
| 2005/0106305 A1 | 5/2005 | Abraham et al. | |
| 2006/0003053 A1* | 1/2006 | Ekanayake et al. | 426/51 |
| 2007/0059409 A1 | 3/2007 | Catani et al. | |
| 2007/0059422 A1 | 3/2007 | Robbins | |
| 2007/0082105 A1 | 4/2007 | Robbins | |
| 2007/0082106 A1 | 4/2007 | Lee et al. | |
| 2009/0162511 A1 | 6/2009 | Shi et al. | |

FOREIGN PATENT DOCUMENTS

| | | |
|---|---|---|
| CN | 1907091 A | 2/2007 |
| CN | 101007042 A | 8/2007 |
| EP | 0 599 646 A2 | 6/1994 |
| EP | 0 684 771 B1 | 9/1997 |
| EP | 1 111 065 A2 | 6/2001 |
| NZ | 549739 * | 9/2006 |
| WO | 02/00041 A1 | 1/2002 |
| WO | 2004/107872 A1 | 12/2004 |
| WO | 2007033278 A2 | 3/2007 |
| WO | 2008/030121 A1 | 3/2008 |
| WO | 2008/129457 A1 | 10/2008 |

OTHER PUBLICATIONS

The Cucurbit Network News—Cucurbitaceae Genera and Species—http://www.cucurbit.org/family/html.*

(Continued)

*Primary Examiner* — Elizabeth Gwartney
(74) *Attorney, Agent, or Firm* — Fitch, Even, Tabin & Flannery, LLP

(57) ABSTRACT

A method of preparing a natural sweetener from a heat-processed powdered fruit extract of the cucurbitaceae family, such as luo han guo is provided. In one embodiment, the method provides a cleaner tasting and concentrated natural sweetener in which objectionable flavors, odors, colors, and insoluble components are removed to form the natural sweetener.

7 Claims, 1 Drawing Sheet

OTHER PUBLICATIONS

Lee, C-H "Intense Sweetener from Lo Han Kuo (Momordica grosvenori)" in Experientia, 31(5), 1975, p. 533-534.*
European Patent Office, Extended European Search Report for Application No. EP 09151075.0 dated Jun. 2, 2009, 6 pages.
C. Xie et al., "Method for Extracting Mogroside V", CAPLUS, Nov. 1, 2006, XP008104603, Abstract, 1 page.
C. H. Lee, "Intense Sweetener from Lo Han Kuo (Momordica grosvenori)," Experientia, 1975, 31 (5), 533-534 (Abstract, 1 page).
R. A. Hussain et al., "Plant-Derived Sweetening Agents: Saccharide and Polyol Constituents of Some Sweet-Tasting Plants," Journal of Ethnopharmacology, 1990, 28 (1), 103-115 (Abstract, 1 page).
E. Vasquez and W. Jakinovich, "Stimulation of the Gerbil's Gustatory Receptors by Some Potently Sweet Terpenoids," Journal of Agricultural and Food Chemistry, 1993, 41 (8), 1305-1310 (Abstract, 1 page).
Zhongdong Liu, "Extraction and Purification of Mogroside V," Lizi Jiaohuan Yu Xifu, 1999, 15 (4), 364-368 (Abstract, 1 page).
Jian-ye Zhang and Xiu-wei Yang, "Assignments of 1H and 13C NMR Signals of Mogroside IVa," Journal of Chinese Pharmaceutical Sciences, 2003, 12 (4), 196-200 (Abstract, 1 page).
Lijuan Yu et al., "Preparation of Mogroside V from Fresh Fruits of Luohanguo by High Performance Liquid Chromatography," Sepu, 2003, 21 (4), 397-399 (Abstract, 1 page).
Q. Q. Li et al., "Siraitia grosvenorii (Luo Han Guo; Cucurbitaceae) is a new host of Ralstonia solanacearum in China," Plant Pathology, 2005, 54 (6), 811 (Abstract, 1 page).
X. Qin et al., "Subchronic 90-Day Oral (Gavage) Toxicity Study of a Luo Han Guo Mogroside Extract in Dogs," Food and Chemical Toxicology, 2006, 44 (12), 2106-2109 (Abstract, 1 page).

* cited by examiner

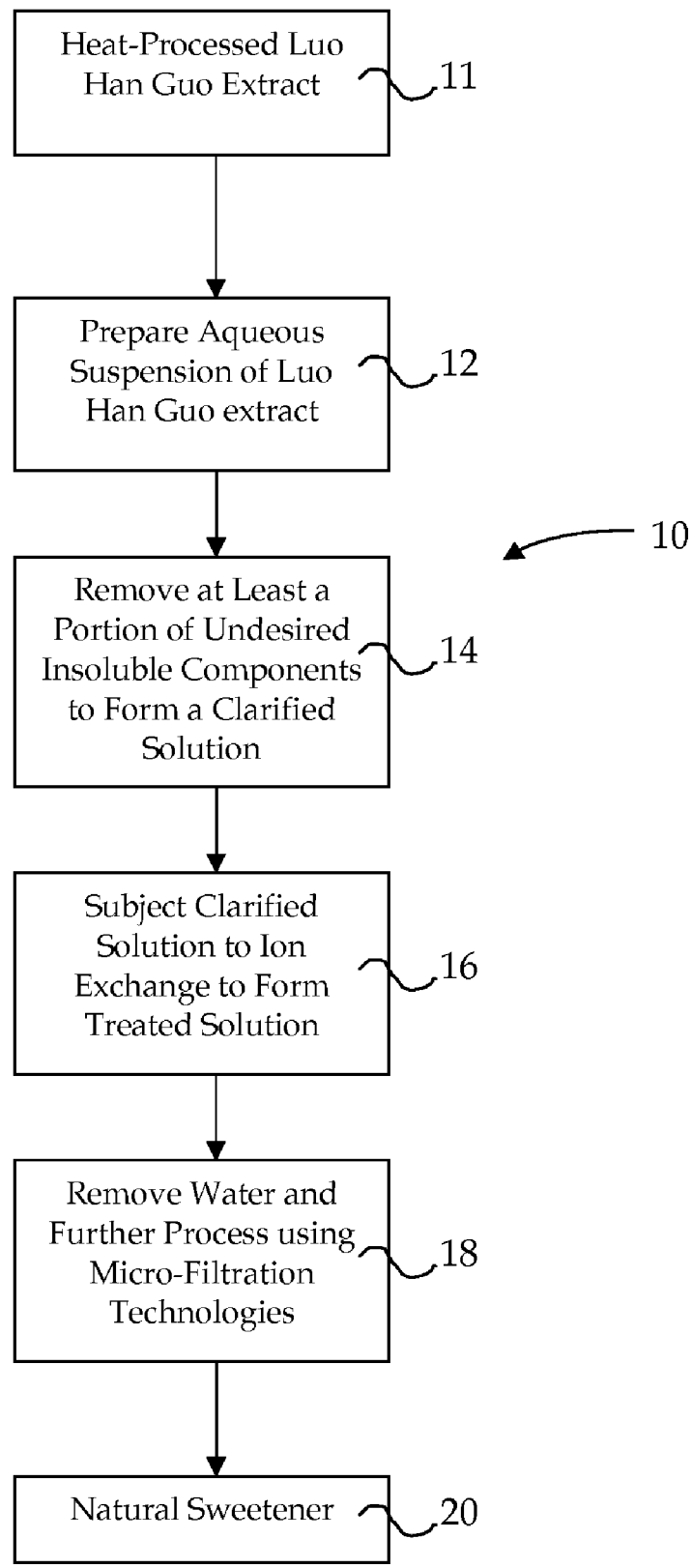

NATURAL SWEETENER AND METHODS OF MANUFACTURING THEREOF

FIELD

The field relates to methods of preparing a natural sweetener from a fruit of the cucurbitaceae family and, in particular, methods of preparing a natural sweetener from a heat-processed, powdered luo han guo extract.

BACKGROUND

Luo han guo generally refers to a fruit of *Siraitia grosvenori*, which is a member of the Cucurbitaceae family, a perennial vine native to certain regions of southern Asia and China. The luo han guo fruit is generally known for its intensely sweet taste, and extracts of the fruit can be up to about 300 times sweeter than sugar. It is believed that the sweetness of luo han guo comes primarily from mogrosides, which are a group of terpene glycosides, generally comprising only about 1 percent of the fleshy part of the luo han guo fruit. It is generally understood that the majority of the sweetness is provided by one particular mogroside, which is commonly labeled mogroside V.

Luo han guo is most commonly available in a powdered extract form, which is reported to have at least about 80 percent mogrosides on a dry basis using a spectrophotometric analysis (generally about 18 to about 23 percent mogroside V on a dry basis using high a performance liquid chromatography (HPLC) analysis). Such extracts are prepared through a process that attempts to remove undesirable organoleptic components. However, the drying process commonly used to preserve the fruit before preparing commercial powders can impart other undesirable colors, flavors, and odors to the extract. As a result, commercially available luo han guo powdered extracts generally cannot be used as a sweetener in foods and beverages unless masking and/or other components are also used to hide the objectionable organoleptic properties.

Commercially available luo han guo fruit also may be subjected to rigorous heat processing or heat treatment to inactivate any viable cells. It is believed that this heat treatment alters the chemistry of the fruit components in the extract. For example, heat-processed fruit extracts are often darker in color, exhibit more off-odors, and more off-flavors than non-heat-processed fruit extracts. Therefore, while heat-processed luo han guo fruit extract may be more readily available as a raw material source, it has the shortcoming that it possesses additional undesired organolepetic characteristics (i.e., flavors, odors, tastes, and colors) as a result of the heat processing that limits its use as a traditional sweetener in foods and beverages. When used as such a sweetener, masking components are also typically needed to hide the undesired organoleptic properties of the heat-processed extract.

Methods of processing fresh luo han guo fruit, rather than the more readily available heat-processed powdered fruit extracts, to attempt removal of undesirable components have been proposed (see, for example, U.S. Pat. No. 4,084,010; U.S. Pat. No. 5,411,755; U.S. Pat. No. 5,433,965; U.S. Pat. No. 6,124,442, U.S. Pat. No. 6,461,659 B1; and U.S. Pat. No. 6,682,766 B2 as well as Patent Application Publication Number US 2006/0003053 A1; and EP 0 684 771 B1). However, fresh luo han guo is difficult to obtain (largely due to export restrictions) and also difficult to store either as fresh fruit or juice obtained from the fresh fruit because it tends to degrade over time. Luo han guo juice has a pH of about 6, and contains sugars that can brown and pectin that can gel upon storage. As a result, the processing methods for fresh luo han guo fruit have limited applicability to those not able to obtain and use such fresh fruit within a short time frame. Moreover, as shown in the Examples, natural sweeteners prepared using such fresh-fruit processing methods still exhibit objectionable organoleptic characteristics.

In addition to requiring raw materials difficult to obtain, the existing methods of treating fresh fruit also generally use cation exchange resins (strong and weak acid exchange resins) that typically remove sulfur-containing amino acids and soluble protein precursors. Strong and weak acid cation exchange resins, however, also have a tendency to bind with mogrosides and remove them from the solution being treated. Therefore, the use of such cation exchange resins to treat mogroside solutions may need to be closely monitored and/or limited in duration so that removal of the desired mogroside molecules is minimized. Such shortcoming adds complexity to the process and generally limits the duration that cation ion exchange can be used for processing. The conventional use of cation exchange resins, therefore, often balances a tradeoff between sufficient resin exchange time to remove unwanted substances and the retention of high levels of mogrosides.

Alternatively, if the cation exchange resins bind and remove large quantities of mogrosides, the resins can be washed using various wash solutions or solvents to release the mogrosides from the resin (See, e.g., CN 1907091 A). Such additional washing steps, however, can add extra expense, time, and processing to the manufacturing process and, therefore, are generally not desired. Moreover, with the use of cation exchange resins that tend to bind with the mogrosides and the subsequent use of wash solvents, the mogrosides have interacted chemically and/or physically with a non-natural component during manufacturing and may be less desired in some cases as a fully natural sweetener due to this interaction.

SUMMARY

Methods are provided of forming a natural sweetener from a processed extract obtained from the fruit of cucurbitaceae family, such as luo han guo. The methods herein use heat-processed fruit extracts, usually in powdered form, rather than fresh luo han guo used in conventional processing methods. As described below, the methods herein further process the powder to remove objectionable organoleptic properties, such as off-flavors, odors, tastes, and/or colors as well as undesired insoluble components that tend to be present in the starting extracts as a result of its prior processing. In one embodiment, the methods use treatment steps that reduce and, preferably, eliminate the interaction of non-natural components (i.e., resins, solvents, etc.) with the desired mogrosides so that the resultant sweetener can be formed with minimal chemical and/or physical interaction of the desired mogrosides with non-natural components.

In one form, the resultant sweetener composition is a cleaner tasting and concentrated mogroside powder that is generally suitable for use as a natural sweetener in comestibles (such as beverages, desserts, confections and the like), pharmaceuticals, supplements, and other products requiring a high intensity, natural sweetener. The resultant mogroside powder can generally be used without the necessity of adding other agents to cover or mask off-flavors, odors, or other defects in the starting extract material because sufficient amounts of the undesired components that cause such defects have been removed from the sweetener.

In one aspect, preferred starting materials for the methods herein are heat-processed fruit extracts of luo han guo having at least about 18 to about 23 percent mogroside V on a dry basis as measured by HPLC. Total mogrosides in such heat-processed extracts can be reported as up to about 80 percent as determined by spectrophotometric methods. As used herein, mogroside content will be reported as mogroside V using an HPLC analysis rather than a spectrophotometric analysis. The initial mogroside content, however, may vary depending on the particular raw materials used.

As discussed previously, commercially available heat-processed fruit extracts, such as the luo han guo extracts, also include undesired flavor and odor volatile defining components, undesired taste and color defining components, and undesired water-insoluble components that generally render the heat-processed extract undesirable for further use as a typical sweetener in foods and beverages. The processes herein remove sufficient amounts of these undesirable components to render the extract suitable for use as a sweetener generally without the need to mask any undesirable organoleptic properties.

In one embodiment, the method first prepares an aqueous suspension or slurry of the heat-processed extract from a fruit of the cucurbitaceae family, such as the luo han guo fruit. Then, the method provides for removal of at least a portion of the undesired water-insoluble components from the aqueous suspension to form a clarified aqueous solution. Next, the clarified aqueous solution is subjected to an ion exchange resin, preferably an anion exchange resin, to form a treated aqueous solution that generally removes at least a portion of the undesired color and taste defining components and many of the undesired off-flavor and odor defining components. Lastly, the treated aqueous solution is concentrated and further clarified to remove additional off-flavors, odors, and colors. Since the anion exchange resins generally do not interact with the mogrosides chemically or physically and the mogrosides are generally water soluble, the mogrosides simply pass through the process and are recovered in the final product.

In one embodiment, the resultant material, which may be dried into a powdered form with a moisture content of about 7 percent or less, is a cleaner tasting and concentrated natural sweetener (relative to unmodified heat-processed and fresh-fruit derived luo han guo sweeteners) including greater than about 30 percent and, preferably, greater than about 40 percent mogroside V on a dry basis (HPLC). In one form, the resultant natural sweetener also includes less than about 50 ppm (preferably about 15 ppm or less) of undesired flavor and odor volatile defining components, less than about 10 mg/gram (preferably about 4 mg/gram or less) of undesired color and taste defining components, and about 0.5 percent or less (preferably about 0.1 percent or less) of undesirable water-insoluble components. Of course, such composition may vary depending on the starting materials, processing conditions, and desired final product characteristics. Such resulting material may be used as a natural sweetener and generally does not impart any off-organoleptic notes.

BRIEF DESCRIPTION OF THE DRAWINGS

FIG. 1 is a flowchart of an exemplary method to prepare a fruit extract from the cucurbitaceae family.

DETAILED DESCRIPTION

Methods are provided of forming a natural sweetener from a fruit extract of the cucurbitaceae family where the natural sweetener has a high level of sweet components and a low or insignificant level of components that provide objectionable organoleptic characteristics. The methods are particularly suited to treat heat-processed, powdered fruit extracts from the luo han guo fruit, but the methods herein are also suitable to process other sweet fruit extracts, other fruits from the cucurbitaceae family, and other sweet extracts containing triterpene glycosides, mogrosides, and the like. In one embodiment, the methods treat a heat-processed or heat-treated luo han guo extract to remove sufficient amounts of components that exhibit objectionable organoleptic properties, such as insoluble components and components that exhibit off-flavors, off-odors, off-colors, and off-tastes that may be inherent in the fruit or extract, and/or most likely tend to be formed in the extract due to the prior processing methods. The resultant material is suitable for use as a natural sweetener in comestibles (such as beverages, desserts, confections to suggest but a few examples), pharmaceuticals, supplements, and other products requiring a high intensity, natural sweetener.

Referring to FIG. 1, one embodiment of a method 10 to prepare a natural sweetener from a heat-processed luo han guo extract 11 is generally illustrated. In this embodiment, the method first prepares an aqueous slurry or suspension 12 of the heat-processed fruit extract 11. Next, at least a portion (at least about 90 percent, preferably at least about 97 percent, and most preferably at least about 99 percent) of any undesired water-insoluble components are removed from the aqueous suspension 12 to form a clarified aqueous solution 14. The clarified aqueous solution 14 is then subjected to an ion exchange resin, preferably an anion exchange resin, to form a treated aqueous solution 16. The ion exchange resin is effective to generally remove significant amounts of the undesired taste and color defining components as well as many off-flavors and off-odors, while at the same time minimizing and, preferably, eliminating any interaction between the desired mogrosides and the resin. In addition, with the use of an anion exchange resin, the methods herein generally avoid a resin washing step to free bound mogrosides from the resin because the resin generally does not significantly interact with the mogrosides. Lastly, the treated aqueous solution is concentrated and further processed using microfiltration-type technology 18 to concentrate and remove additional off-flavor, off-odor, and off-color components to form the natural sweetener 20. With the mogrosides being largely water soluble and the use of the anion exchange resins that do not bind or interact with the mogrosides, the desired mogrosides simply pass through the process into the recovered solution.

The resultant sweetener, which may be dried into a powdered form, is a cleaner tasting and concentrated natural sweetener (as compared to unmodified heat-processed and fresh-fruit derived luo han guo sweeteners) that generally does not impart any significant off-organoleptic notes. Preferably, the resultant material is dried to obtain a powdered form, but the filtered and concentrated material may also be used as an aqueous solution. Other uses and forms of the resultant material are also possible.

A preferred starting material is a heat-processed fruit extract of luo han guo, which preferably includes at least about 18 percent and, more preferably, at least about 23 percent total mogroside V on a dry basis (HPLC). Suitable starting materials include, for example, Mormordica 80% (Amax NutraSource, Inc., California) and PureLo (BioVittoria, New Zealand) to suggest but a few sources. Other sources are, of course, also suitable for use in the methods herein. Such extracts are available in powdered, liquid, and concentrated forms. By one approach, preferred extracts are a powdered material with about 5 percent or less moisture and, preferably, about 4 percent or less moisture. In some forms, the powdered extracts are also capable of being processed through an 80 mesh screen, but such granulation size is not a requirement as other sizes are also appropriate for the methods herein. It will be appreciated that the compositions, form, and other characteristics of the starting material can vary depending on the source, composition, and other processing parameters used to form the starting material.

While not intending to be limited by theory, it is believed that the desired sweet component in the extract is supplied from mogroside V. This component has the general chemical formula (A) shown below where R and R' are various glucose residues. These mogrosides generally have average molecular weights ranging from about 1,100 to about 1,500 Dalton (and preferably about 1,100 to about 1,300 Dalton), and tend to be very soluble in water. In one form, mogroside V has an average molecular weight of about 1,287 Dalton. The methods herein remove significant amounts of the undesirable components from the extract while maintaining high levels of this desired mogroside component. In one aspect, removal of significant amounts of undesired components includes the removal of an amount of the undesired components sufficient to provide the desired sweetness and organoleptic properties in a food or beverage without the need for masking agents. In addition, the methods herein process and concentrate the mogroside composition with minimal and, preferably, no interaction of the mogrosides with non-natural components, such as ion exchange resins and/or wash solvents.

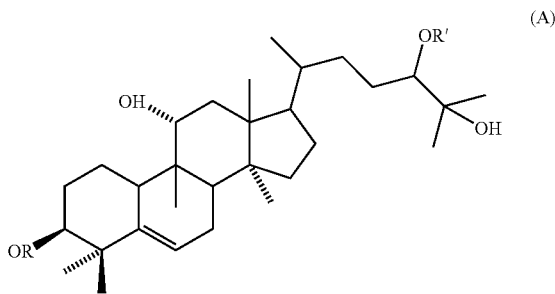

(A)

As discussed in the background, commercially available luo han guo fruit is often subjected to rigorous heat processing or treatment to inactivate any enzymes and viable cells. It is believed that such heat processing alters the chemistry of the fruit and, therefore, extracts prepared from the fruit, generally resulting in additional off-flavors, off-odors, intense and unexpected colors, undesirable tastes, and/or the presence of insoluble materials that can provide unexpected and undesired mouthfeel and other properties when used as a sweetener in food and beverage unless significant amounts of masking or other agents are included. As a result, while the commercially available heat-processed fruit extracts are generally easier to obtain and store (relative to fresh luo han guo) because they are more readily available and generally not subject to the stability issues of fresh fruit, the heat-processed fruit extracts can be difficult to use as a typical sweetener due to colors, flavors, odors, and taste components that are generally not accepted by many consumers.

For example, unmodified, heat-processed fruit extracts (the starting materials for the methods herein) can contain quantities of undesired flavor and odor volatile defining components (such as aldehydes, unsaturated aldehydes, methyl ketones, butyl crotonate, and the like), significant amounts of undesired color and taste defining components (such as phenolics and the like) and significant amounts of undesired water-insoluble components. These components can provide strong flavors, intense colors, strong odors, and/or other undesirable organoleptic properties to the extract that are generally not expected or desired in a sweetener.

In some cases, for example, it has been determined that unmodified, commercially available heat-processed luo han guo extracts can include up to about 80 ppm undesired flavor and odor volatile defining components, up to about 60 mg/gram of undesired color and taste defining components, and up to about 4 percent undesired insoluble components. In particular, unmodified, commercially available heat-processed luo han guo extracts can include between about 1 and about 45 ppm aldehydes (i.e., hexanal, heptanal, octanal, nonanal, decanal, and the like), up to about 2 ppm unsaturated aldehydes (i.e., octenal, undecenal, 1-decadienal, 2-decadienal, and the like), up to about 3 ppm methyl ketones (i.e., 2-heptanone, 2-undecanone, and the like), up to about 31 ppm butyl-crotonate, up to about 60 mg/gram phenolics, and up to about 4 percent insoluble components. Of course, the above ranges can vary depending on the composition, source, and other characteristics of the fruit. While not intended to be limited by theory, it is believed that aldehydes can impart strong grassy/hay-like and/or ashy/smoky flavor notes and can be linked to lipid oxidation; unsaturated aldehydes can provide stale and fatty notes; methyl ketones can provide fruity and/or blue cheese flavors and odors; and butyl-crotonate can provide fruity flavors. All of these flavors and odors are generally undesired in a sweetener because they impart unexpected tastes and smells to comestibles when used in place of traditional sweeteners.

In one embodiment, the method first prepares an aqueous suspension or slurry of the powdered heat-processed fruit extract. Generally, the suspension has about 2 to about 15 percent solids, preferably, about 9 to about 11 percent solids, and most preferably about 10 percent solids. The slurry may be prepared by adding the appropriate amount of powdered extract to an amount of water and suspending the powder to form a uniform slurry. By one approach, mixing of about 30 minutes is sufficient to form such a uniform slurry. The slurry generally includes water soluble components and water-insoluble components.

Next, at least a portion of any undesired water-insoluble components are removed from the slurry. By one approach, at least about 90 percent, preferably about 97 percent, and most preferably at least about 99 percent of the undesired water-insoluble components are removed from the aqueous slurry to form a clarified filtrate or a clarified aqueous solution. It is believed these undesired water-insoluble components include macromolecules (such as polysaccharides, proteins, and the like) or other poorly soluble molecules. By one approach, the undesired water-insoluble components are removed using simple filtration, vacuum filtration, membrane filtration, filtration aids, centrifugation, decanting, or various combinations thereof. Possible filtration aids include fiber, wool, diatomaceous earth, charcoal, and mixtures thereof. In one aspect of the filtration, this removal step can be accomplished between about 32° F. and about 212° F. and at both sub-atmospheric and atmospheric pressures. Preferably, the undesired water-insoluble components are removed using vacuum filtration to form the clarified filtrate or clarified aqueous solution. As the mogrosides are soluble in water, they generally pass through the filter into the clarified filtrate or clarified aqueous solution.

Next, the clarified aqueous solution is subjected to an anion exchange resin to form a treated aqueous solution. The anion exchange resin is effective to generally remove sufficient amounts of the undesired color and taste defining components and many of the undesired flavor and odor volatile defining components, but the resin preferably does not interact in any significant amount with the desired mogroside content. By one approach, the anion exchange resin removes sufficient amounts of the undesired color and taste defining components, such as sufficient amounts of phenolic components, generally without substantially interacting with or binding with the mogroside components. Preferably, the anion exchange resin removes at least about 50 percent, and more preferably, at least about 94 percent of the undesired color and taste defining components (i.e., phenolic components and the like) and portions of the undesired flavor and odor defining components from the clarified aqueous solution to form the treated aqueous solution. Because the resin generally does not bind or interact with the mogroside components, they simply pass through the resin column and the treated aqueous solution contains the desired mogroside V components.

In one aspect, the anion exchange resin is preferably a food grade adsorbent anion exchange resin, such as strong base or weak base anion exchange resins. Suitable resins are Amberlite™ series resins (Rohm and Haas, Philadelphia, Pa.); however, other anion exchange resins are also suitable depending on the particular application so long as the resin has minimal and, preferably, no interaction with the mogrosides and is effective to remove sufficient amounts of the undesired color and taste defining components.

As discussed in the Background, existing processing methods commonly use cation exchange resins that have been discovered to possess only a limited ability to remove undesired color and taste defining components, such as phenolic and the like compounds. In particular, phenolic compounds are anionic and, therefore, will typically not be removed using the prior methods with cation exchange resins. Therefore, the existing processing methods discussed in the Background would not sufficiently remove the undesired color and taste defining components from heat-processed luo han guo extracts.

The methods herein, on the other hand, form the treated aqueous solution after exposure with the anion exchange resin that includes most, if not substantially all, of the mogroside components that were originally present in the initial aqueous slurry (it is expected that at least about 90 percent or greater and, preferably, about 90 to about 100 percent of the mogroside V will be recovered). Because the ion exchange resins are anionic, they generally will not interact or bind with the mogrosides so that the mogrosides simply pass through the ion exchange columns without interacting with the resins therein. Use of such resins is advantageous because it eliminates the need to wash the resin column to remove any bound mogrosides or the need to carefully monitor the contact time of the solution with the resin to minimize removal of the mogrosides. The clarified aqueous solution may be in contact with the anionic resin for a sufficient time to remove the undesired color and taste components and other undesired materials to desired levels.

Lastly, the treated aqueous solution is concentrated and further processed to remove additional undesired off-flavors, off-odors, and off-colors. In one embodiment, such concentration and additional processing is completed by removing water and undesired water-soluble components less than about 1,000 Dalton and, preferably, less than about 500 Dalton using, for example, ultrafiltration, nanofiltration, diafiltration, microfiltration, reverse osmosis, and the like, or combinations thereof. By one approach, such water-soluble components are removed using an ultrafiltration membrane between 32° F. to about 212° F. For example, a suitable membrane is a 1,000 Dalton MWCO polyethersulfone membrane (Pall Corporation) operated at room temperature (i.e., about 75° F.) and about 50 psig; however, other types of membranes and operating conditions appropriate for such membranes may also be used. Preferably, any size membrane can be used so long as it generally does not remove significant amounts of the desired mogrosides.

Evaporation may also be used together with or instead of the microfiltration-type membranes to concentrate the treated aqueous solution. However, evaporation by itself (without microfiltration-type processing) generally forms a less desirable product that still exhibits some off-notes. While not intending to be limited by theory, in addition to concentrating the solution, it is believed that the microfiltration-type membranes further improves the clarified aqueous solutions by removing additional undesired water-soluble, flavor, color, and/or odor active components that are not removed when using only evaporation.

The resultant aqueous solution is a cleaner tasting and concentrated natural sweetener (relative to unmodified heat-processed and fresh-fruit derived luo han guo sweeteners), which is formed out of a heat-processed luo han guo extract, that generally does not impart any off-organoleptic notes. The resultant material is a solution having about 10 to about 30 percent solids (generally, higher solids preferred). By one approach, the resultant solution is dried using spray-drying, freeze drying, drain-drying, or the like techniques to form a powdered sweetener having a moisture content of about 7 percent or less.

In one example of the method, the resultant material (as compared to the starting heat-processed extract) has at least about 97 percent and, preferably, at least about 99 percent of the undesired water-insoluble components removed; at least about 60 percent and, preferably, at least about 81 percent of the undesired flavor and odor volatile defining compounds removed; and at least about 50 percent and, preferably, at least about 95 percent of the undesired color and taste defining components removed. For purposes herein, the undesired flavor and odor volatile defining components shall include at least aldehydes, methyl ketones, butyl crotonate, and similar compounds. The undesired color and taste defining components shall include at least phenolic and similar compounds.

In another example, compared to the starting heat-processed fruit extract, the resultant product has at least about 45 percent less aldehydes (preferably about 45 to about 81 percent less aldehydes), at least about 50 percent less unsaturated aldehydes (preferably about 50 to about 84 percent less unsaturated aldehydes), at least about 50 percent less methyl ketones (preferably about 50 to about 83 percent less methyl ketones), at least about 50 percent less butyl-crotonate (preferably about 50 to about 88 percent less butyl-crotonate), and at least about 50 percent less phenolic components (preferably about 50 to about 95 percent less phenolic components). At the same time, the resultant material preferably includes at least about 30 percent and, preferably, at least about 40 percent mogroside V on a dry basis (HPLC). Of course, the above results are only but one example of processing luo han guo extracts by the methods described herein. It will be appreciated that these results may vary depending on the composition of the starting material, process conditions, and other factors.

In another example, after subjecting the extract to the methods herein, the resultant material also preferably has less than about 10 mg/gram and, preferably, less than about 4 mg/gram of the undesired color and taste defining components; less than about 50 ppm and, preferably, about 15 ppm or less of the undesired flavor and odor volatile defining components; and about 0.5 percent or less and, preferably, about 0.1 percent or less of the undesired water-insoluble components. In yet another example, the resulting product preferably contains about 10 ppm or less aldehydes, about 0.6 ppm or less unsaturated aldehydes, about 0.5 ppm or less methyl ketones, and about 4 ppm or less butyl-crotonate. More specifically, the resultant material preferably includes about 0.5 ppm or less hexanal, about 1 ppm or less heptanal, about 1.5 ppm or less octanal, about 7 ppm or less nonanal, about 0.5 ppm or less decanal, about 0.1 ppm or less octenal, about 0.3 ppm or less undecenal, about 0.1 ppm or less 1-decanienal, about 0.1 ppm or less 2-decadienal, about 0.5 ppm or less 2-heptanone, about 0.1 ppm or less 2-undecanone; and about 3.8 ppm or less butyl-crotonate. Of course, the various components and amounts thereof in the resultant materials described in the preceding discussion may vary depending on the particular starting materials, the process conditions, and other factors.

A solution of the resultant material also generally does not have an intense color. While not wishing to be limited by theory, it is believed that the reduction in color is due in part to the reduction in phenolic components. For example, using a spectrophotometer or colorimeter, a solution of the starting (unmodified) raw material can generally exhibit the following colors: A(1%, 1 cm) 400 nm: 1.490; A(1%, 1 cm) 500 nm: 0.234; A(1%, 1 cm) 600 nm: 0.047; and A(1%, 1 cm) 700 nm: 1.490 (i.e., the absorption of a 1 percent solution in a 1 cm thick cell). After the methods herein, a solution of the resultant material preferably exhibits the following colors: A(1%, 1 cm) 400 nm: 0.074; A(1%, 1 cm) 500 nm: 0.006; A(1%, 1 cm) 600 nm: 0.002; and A(1%, 1 cm) 700 nm: 0.000. Accordingly, there is about 95 to about 100 percent decrease in color within 400 to 700 nm wavelengths.

In addition, advantages and embodiments of the process described herein are further illustrated by the following examples; however, the particular conditions, flow schemes, materials and amounts thereof recited in these examples, as well as other conditions and details, should not be construed to unduly limit this method. All percentages are by weight unless otherwise indicated.

EXAMPLES

Example 1

Commercially available heat-processed mogroside powders were analyzed to determine their initial, unmodified compositions. Mormordica 80 percent (Amax NutraSource, Inc., California), PureLo (BioVittoria, New Zealand), and ACT (Hamburg, Germany) were tested to determine insoluble content, color, phenolic content, and flavor/odor volatile content.

Insoluble content was determined using a gravimetric analysis. Approximately 100 mg of the mogroside sample was weighed into a tared test tube. About 5 ml of room temperature water was added and the contents mixed thoroughly. The sample was centrifuged using a low-speed desk centrifuge after which the supernatant liquid was discarded. The tube was up-ended and the neck of the tube dried carefully by wiping with a tissue. The tube was then placed under a high vacuum overnight to remove residual water. The tube containing the dry sample was then weighed. The insoluble content or residue was calculated using equation B:

$$\% \text{Residue(Insoluble content)} = \frac{(\text{Weight Tube Final-Tube Tare Weight})}{(\text{Starting Sample Weight})} \times 100 \quad (B)$$

Total phenolic content was determined through analysis at Brunswick Laboratories (Norton, Mass.) using a Folin-Ciocalteu phenol reagent.

Flavor/odor volatile components were determined by purging/trap GC-MS and quantified relative to d8-tolune. The volatile compounds were purged from the sample with a constant flow of nitrogen for a fixed amount of time and collected in a Tenax™ trap. The volatile compounds caught in the trap were desorbed using a thermal desorber system (Gerstel, GmbH, Germany) and later separated by gas chromatography (GC) and identified by mass spectrophotometry (MSD). Concentrations of major volatile compounds found in the sample were calculated relative to the addition of a known amount of an isotopic standard (d8-tolune) spiked into the samples.

Color was determined by preparing a 1 percent solution and transferring the solution to a 1 cm thick color measuring cell. The absorbance value compared to a water blank was then determined using a colorimeter.

In this case, flavor/odor volatile content was considered to be the amount of aldehydes, unsaturated aldehydes, methyl ketones, and butyl-crotonate in each preparation. Results of each sample are listed in Table 1 below.

TABLE 1

Unmodified Commercial Mogroside Preparations

| | Unmodified Mogroside Sample | | |
|---|---|---|---|
| Characteristic | AMAX | PureLo | ACT |
| Insolubles (%) | 3.9 | 1.0 | 0.9 |
| Color | | | |
| A(1%, 1 cm) 400 nm | 1.490 | 1.430 | 1.275 |
| A(1%, 1 cm) 500 nm | 0.234 | 0.247 | 0.122 |
| A(1%, 1 cm) 600 nm | 0.047 | 0.043 | 0.021 |
| A(1%, 1 cm) 700 nm | 0.011 | 0.008 | 0.004 |
| Phenolics (mg/g) | 56.44 | 52.91 | 51.23 |
| Flavor/Odor Volatiles (ppm) | 80 | Not measured | Not measured |
| Mogroside V (%) (HPLC) | 19.7 | Not measured | Not measured |

Example 2

The unmodified AMAX commercially available heat-processed extract from Example 1 was further analyzed to determine the concentrations of various flavor/odor volatile components using the method provided in Example 1. The sample was analyzed to determine the amounts of aldehydes (hexanal, heptanal, octanal, nonanal, and decanal), saturated aldehydes (octenal, undecenal, 1-decadienal, 2-decadienal), methyl ketones (2-heptanone and 2-undecanone), and butyl-crotonate. The results are provided in Table 2 below.

TABLE 2

Flavor/Odor Volatile Components of Unmodified AMAX

| Compound | Concentration, ppm (dry) |
|---|---|
| Hexanal | 2.1 |
| Heptanal | 1.6 |
| Octanal | 4.6 |
| Nonanal | 33.9 |
| Decanal | 1.2 |
| Octenal | 0.6 |
| Undecenal | 0.7 |
| 1-Decanienal | 0.2 |
| 2-Decadienal | 0.3 |
| 2-Heptanone | 2.2 |
| 2-Undecanone | 0.2 |
| Butyl-crotonate | 30.9 |

Example 3

The unmodified AMAX luo han guo extract from Example 1 was further processed and concentrated using the methods disclosed herein to remove undesirable organoleptic characteristics.

About 50 grams of the unmodified AMAX extract was suspended in room temperature water (about 25° C.) to form an aqueous suspension or slurry having about 2 percent solids. The aqueous suspension was then subjected to vacuum filtration at room temperature using a Whatman #2 filter paper (Whatman Inc., Florham Park, N.J.) to remove water-insoluble components to form a clarified filtrate or clarified aqueous solution. The clarified filtrate was then passed through an anionic ion exchange resin column having an Amberlite™ resin (Rohm & Haas, Philadelphia, Pa.) and operated at room temperature to form a treated aqueous solution. The treated aqueous solution was then processed through an ultrafiltration membrane having a 1,000 Dalton MWCO (Pall Corporation, East Hills, N.Y.) at room temperature at 50 psig to form a treated luo han guo extract. The extract was then freeze-dried to form a treated luo han guo powder.

The resultant powder material was tested using the procedures of Example 1 to determine color, flavor/odor volatiles, and insoluble content. Mogroside content was determined using HPLC. The results are provided in Tables 3 and 4 below with the percentage improvement over the unmodified AMAX samples of Examples 1 and 2 above.

TABLE 3

| Characteristic | Inventive Mogroside Sample | Improvement over unmodified AMAX (% Less) |
|---|---|---|
| Insolubles (%) | <0.1 | >97 |
| Color | | |
| A(1%, 1 cm) 400 nm | 0.074 | 95 |
| A(1%, 1 cm) 500 nm | 0.006 | 97 |
| A(1%, 1 cm) 600 nm | 0.002 | 95 |
| A(1%, 1 cm) 700 nm | 0.000 | 100 |
| Phenolics (mg/g) | 3.29 | 94 |
| Flavor Volatiles (ppm) | 15 | 81 |
| Mogroside V (%) | 41.5 | 110 (% More) |

TABLE 4

| | Processed Sample | |
|---|---|---|
| Compound | Inventive Concentration (ppm) | Improvement over unmodified AMEX of EX. 2 (% Less) |
| Hexanal | 0.5 | 75 |
| Heptanal | 0.9 | 45 |
| Octanal | 1.4 | 70 |
| Nonanal | 6.6 | 81 |
| Decanal | 0.4 | 69 |
| Octenal | 0.1 | 84 |
| Undecenal | 0.3 | 53 |
| 1-Decanienal | 0.1 | 50 |
| 2-Decadienal | 0.1 | 66 |
| 2-Heptanone | 0.4 | 83 |
| 2-Undecanone | 0.1 | 50 |
| Butyl-crotonate | 3.8 | 88 |

The method of this example was estimated to retain about 90 percent of the mogroside V present in the unmodified AMAX. In general, it is expected the methods described herein will permit retention in the modified samples of about 90 to about 100 percent of the mogroside V present in the starting sample. Furthermore, it is expected that other heat processed fruit extracts (such as, for example, PureLo, Act, and Go-Luo among others) would also exhibit similar improvements upon subjecting them to the methods herein because they are all sourced from a heat processed fruit.

Example 4

A descriptive profile analysis of luo han guo extracts was conducted with an expert panel consisting of experienced taste testers. Each sample was evaluated for various attributes, and a 15 point scale was used to quantify each attribute with 0 being none and 15 exhibiting an extremely high intensity. The participants were asked to have water and crackers with a 5-minute break between samples. The samples were randomized through the study.

Aqueous solutions of an inventive mogroside sample, unmodified AMAX, and unmodified AMAX LHG were sampled by the panel. The inventive mogroside sample was a commercially available heat-processed luo han guo extract (AMAX) prepared using the exemplary inventive procedures of Example 3. Unmodified AMAX is a commercially available heat-processed luo han guo extract used as provided directly by the vendor. Unmodified AMAX LHG is a commercial sample available from Amax NutraSource, Inc., California, that is believed to be manufactured using the methods of U.S. Pat. No. 5,411,755; it was also used directly as provided by the vendor.

All samples were dissolved in water in amounts calculated to be of similar sweetness intensity to an 8 percent sucrose solution. The amounts added to water were generally based upon manufacturers' sweetness specifications and known sweetness expectations of these raw materials. AMAX and the inventive mogroside sample are generally about 125× sweeter than an 8 percent sucrose solution and, therefore, were added to water at about 0.64 g/L. AMAX LHG is generally about 10× sweeter than an 8 percent sucrose solution and, therefore, was added to water at about 8 g/L. The results of the taste study are provided below in Table 5.

While the results in Table 5 show the Unmodified AMAX and AMAX LHG exhibiting a slightly lower sweetness attribute than the inventive mogroside sample, it is expected that if the AMAX and AMAX LHG had a similar sweetness to the inventive mogroside sample, then they would also have exhibited even higher levels of the other, undesired flavor attributes. In such case, the methods herein would have provided an even greater improvement to the inventive mogroside sample over the unmodified, commercially available samples.

TABLE 5

Taste Study Results

| Attribute | (Inventive) AMAX[1] | (Comparative) Unmodified AMAX | (Comparative) Unmodified AMAX LHG |
|---|---|---|---|
| Sweet | 8.65, 8.62 | 6.37 | 4.67 |
| Sour | 0.73, 1.03 | 1.33 | 1.85 |
| Bitter | 2.50, 1.87 | 3.18 | 3.67 |
| Ashy/Smoky | 1.05, 0.98 | 3.30 | 6.83 |
| Grassy, Hay-Like | 1.38, 1.08 | 2.45 | 3.07 |
| Medicinal/Metallic | 1.63, 1.05 | 1.72 | 2.10 |

[1]Duplicate results determined on different days

In all cases, the inventive sample exhibited significant improvements in organoleptic properties over the comparative samples. The attribute levels of the inventive samples are considered as not imparting any significant or objectionable characteristics to the sweetener.

Example 6

About 500 grams of unmodified Go-Luo Luo Han Guo P. E. 80% (MB North America, Torrance, Calif.) was suspended in room temperature water to form an aqueous suspension having about 8 percent solids. The aqueous suspension was then filtered, treated, concentrated, and spray dried using the procedures of Example 3. The resultant material exhibited similar characteristics as the sample prepared in Example 3.

It will be understood that various changes in the details, materials, and arrangements of the process, formulations, and ingredients thereof, which have been herein described and illustrated in order to explain the nature of the method and natural sweetener, may be made by those skilled in the art within the principle and scope of the embodied method as expressed in the appended claims.

What is claimed is:

1. A method of forming a natural sweetener from a heat-processed fruit extract of luo han guo, the method comprising:

preparing an aqueous slurry of the heat-processed fruit extract of luo han guo, the heat-processed fruit extract including an amount of mogrosides, color, odor, and taste defining components, water-insoluble components, and water-soluble components;

removing at least a portion of the water-insoluble components from the aqueous slurry to form a clarified solution;

exposing the clarified solution to an ion exchange resin which consists essentially of an anion exchange resin to effect removal of at least a portion of the undesired color and taste defining components to form an ion exchange resin treated solution, the clarified solution being exposed to the ion exchange resin to the substantial exclusion of a cationic resin to effect recovery of at least about 90% of the mogrosides that were in the heat processed fruit extract;

removing from the ion exchange resin treated solution at least a portion of the water-soluble components having a molecular weight less than a molecular weight of the mogrosides in the anion exchange resin treated solution to form the natural sweetener which has at least about 90% of the mogrosides that were in the heat processed fruit extract;

wherein the natural sweetener includes at least about 60 percent less of the odor defining components relative to the heat-processed fruit extract and at least about 50 percent less of the color and taste defining components relative to the heat-processed fruit extract; and wherein the natural sweetener has less than about 0.5 percent of the water-insoluble components based on a total weight of the natural sweetener.

2. The method of claim 1, wherein removing the water-insoluble components from the aqueous slurry includes subjecting the aqueous slurry to a water-insoluble removal step selected from the group consisting of filtration, filtration with filtration aids, centrifugation, decanting, and combinations thereof.

3. The method of claim 2, wherein removing at least a portion of the water-soluble components having a molecular weight less than a molecular weight of the mogrosides includes removing the water-soluble components having a weight of less than about 1,000 Daltons from the ion exchange resin treated solution by subjecting the ion exchange resin treated solution to water-soluble component removal step selected from the group consisting of ultrafiltration, nanofiltration, diafiltration, microfiltration, reverse osmosis, and combinations thereof.

4. The method of claim 1, wherein the natural sweetener includes at least about 30 percent mogroside V on a dry basis as determined used HPLC.

5. The method of claim 1, wherein the natural sweetener includes about 60 to about 81 percent less odor defining components relative to the heat-processed fruit extract.

6. The method of claim 1, wherein the odor defining components include at least one of saturated aldehydes, unsaturated aldehydes, methyl ketones, butyl crotonate, and combinations thereof.

7. The method of claim 6, wherein the natural sweetener includes at least about 45 percent less saturated aldehydes, at least about 50 percent less unsaturated aldehydes, at least about 50 percent less methyl ketones, and at least about 50 less percent butyl-crotonate relative to the heat-processed fruit extract.

* * * * *